Jan. 6, 1953      K. E. PORTER      2,624,493
WHISTLING TEAKETTLE AND HANDLE
Filed March 21, 1947
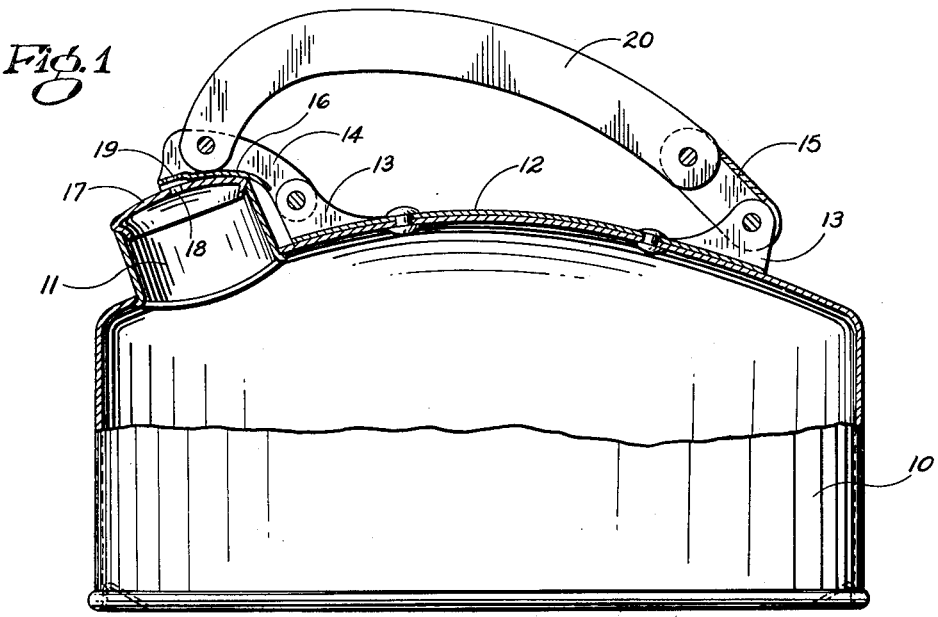
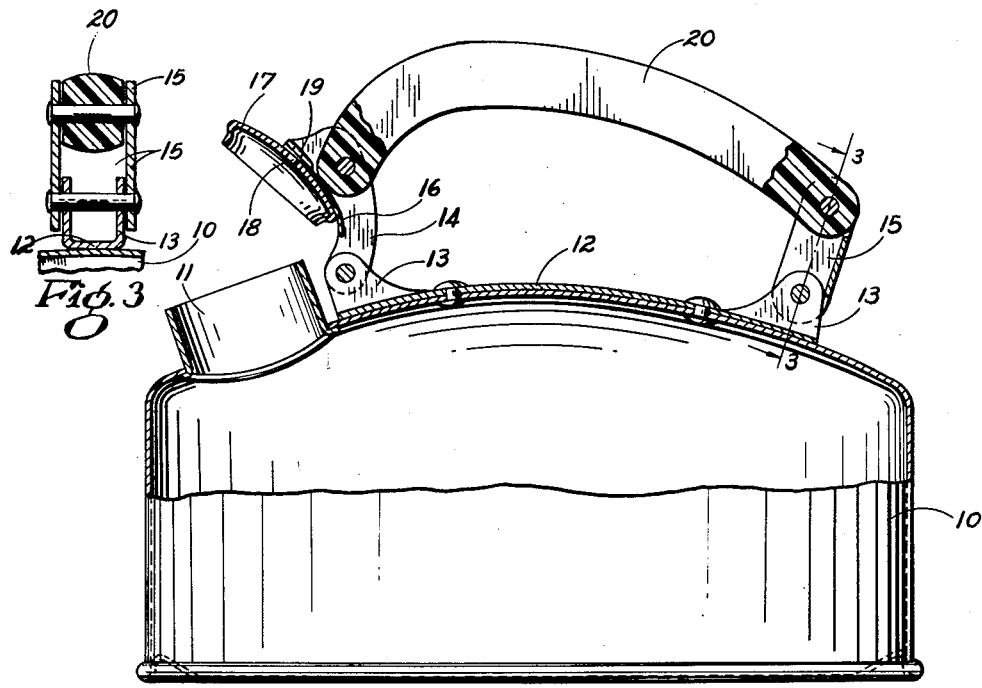
INVENTOR.
KIRK E. PORTER
BY *Richey & Watts*
ATTORNEYS Patented Jan. 6, 1953

2,624,493

UNITED STATES PATENT OFFICE 2,624,493

WHISTLING TEAKETTLE AND HANDLE

Kirk E. Porter, Wooster, Ohio, assignor to The Buckeye Aluminum Company, Wooster, Ohio, a corporation of Ohio Application March 21, 1947, Serial No. 736,135

1 Claim. (Cl. 222—469)

This invention relates broadly to vessels of the type that are provided with a closure which is opened by a bail or handle when the vessel is lifted thereby and closed when the handle is released.

The embodiment chosen herein as illustrative of one application of the invention comprises a tea kettle having a spout thereon which is capped by a disc type whistle formed for intimate engagement with the throat of the spout when disposed in its closed position. The whistle is hinged to the spout and inter-linked with a handle which is designed to effect the elevation thereof when the kettle is lifted and rocked into pouring position. The handle is further designed so that the weight thereof will cause the depression of the whistle disc when the handle is released.

One of the objects of the invention is to provide linkage for elevating a spout whistle for a tea kettle when the kettle is lifted and held by the handle in a pouring position.

Another object of the invention is to provide linkage which is positive of active irrespective the angle at which the kettle is held during the elevation thereof.

Further objects of the invention reside in the provision of a kettle which is attractive of appearance, durable of structure, economic of manufacture, and susceptible of operation without the hazard of injury resulting from accidental side sway.

Other objects and advantages more or less ancillary to the foregoing and the manner in which all the various objects are realized will appear in the following description, which, considered in connection with the accompanying drawings, sets forth the preferred embodiment of the invention.

Referring to the drawings:

Fig. 1 is a side elevational view partially in section of a tea kettle embodying the present invention;

Fig. 2 is a similar view of the kettle illustrating the handle and spout cover in their actuated position; and Fig. 3 is a vertical section through a portion of the handle, the section being taken on a plane indicated by the line 3—3 in Fig. 2.

As illustrated in Fig. 1, the tea kettle comprises generally a closed vessel 10 having a spout 11 on the upper face thereof, a cap for the spout and a handle inter-linked therewith. The handle is supported by a plate 12 which is riveted or otherwise attached to the top of the vessel and formed with spaced vertically disposed ears 13 fabricated for the reception of links 14 and 15. The link 14 is formed from a sheet metal blank embodying a center portion 16 and similar elongated side sections which constitute the arms of the link. The center portion is formed complementary to the top or dome of the cap and is welded or otherwise affixed thereto. The sides of the blank are folded upwardly normal to the center portion 16 and the ends thereof are pierced for the reception of the pivot pins in the ears 13 and the handle. The dome of the cap 17 is formed with a small opening 18 which is disposed in aligned relation with a similar opening 19 in an offset end portion of the body 16. The size of the two openings and the spaced relation of the offset end of the central portion of the link to the face of the cap are proportioned to form a whistle of the double-diaphragm type.

The link 15 is formed from a sheet metal blank embodying similar side sections and a central tie bar, the side sections being folded upwardly normal to the tie bar and constituting the arms of the link. The ends of the arms are pierced to receive the pivot pins in the contiguous ears 13 and rear end of the handle 20. The arms of the links 14 and 15 are spaced to overlie the side walls of the ends of the handle and afford the free pivotal movement thereof. The handle is preferably constructed from a molded plastic material of low thermal conductivity.

In operation, when the kettle is lifted by the handle 20 the weight of the body of the vessel will draw the links 14 and 15 into a substantially vertical position and thus effect the elevation of cap 17 from the end of the spout 15. When the forward end of the kettle is rocked downwardly to a pouring position, the angular relation of the links, though slightly altered, will still maintain the cap in elevated relation to the mouth of the spout. The weight of the handle 20 and associated parts and the clearance provided in the pivotal connections of the assembly are designed to effect the closure of the cap when the handle is released and the kettle is brought to rest on the base thereof.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

A tea kettle comprising a closed vessel with a pouring spout at one side, a closure for the spout, a first link pivoted at one end to the top of the vessel adjacent the spout and connected at the other end to the closure, a second link substantially parallel to the first link pivoted to the other side of the vessel in alignment with the spout and the first link, a rigid handle for lifting the kettle pivoted at each end to the free ends of the links respectively for movement toward and away from the vessel and the spout, said links being inclined toward the spout when said closure is in the spout covering position, the closure being biased against the spout by the weight of the handle and the toggle effect of the inclined links.

KIRK E. PORTER.

REFERENCES CITED

The following references are of record in the file of this patent:

UNITED STATES PATENTS

| Number | Name | Date |
|---|---|---|
| 1,173,989 | Thalman | Feb. 29, 1916 |
| 1,486,802 | Royse | Mar. 11, 1924 |
| 2,335,195 | Packer | Nov. 23, 1943 |